April 7, 1959 E. R. OLSON 2,880,698
APPARATUS FOR APPLYING AXIALLY EXTENDING STRIPES TO
THE SURFACE OF AN INSULATED WIRE OR CORD
Filed March 8, 1956 4 Sheets-Sheet 1
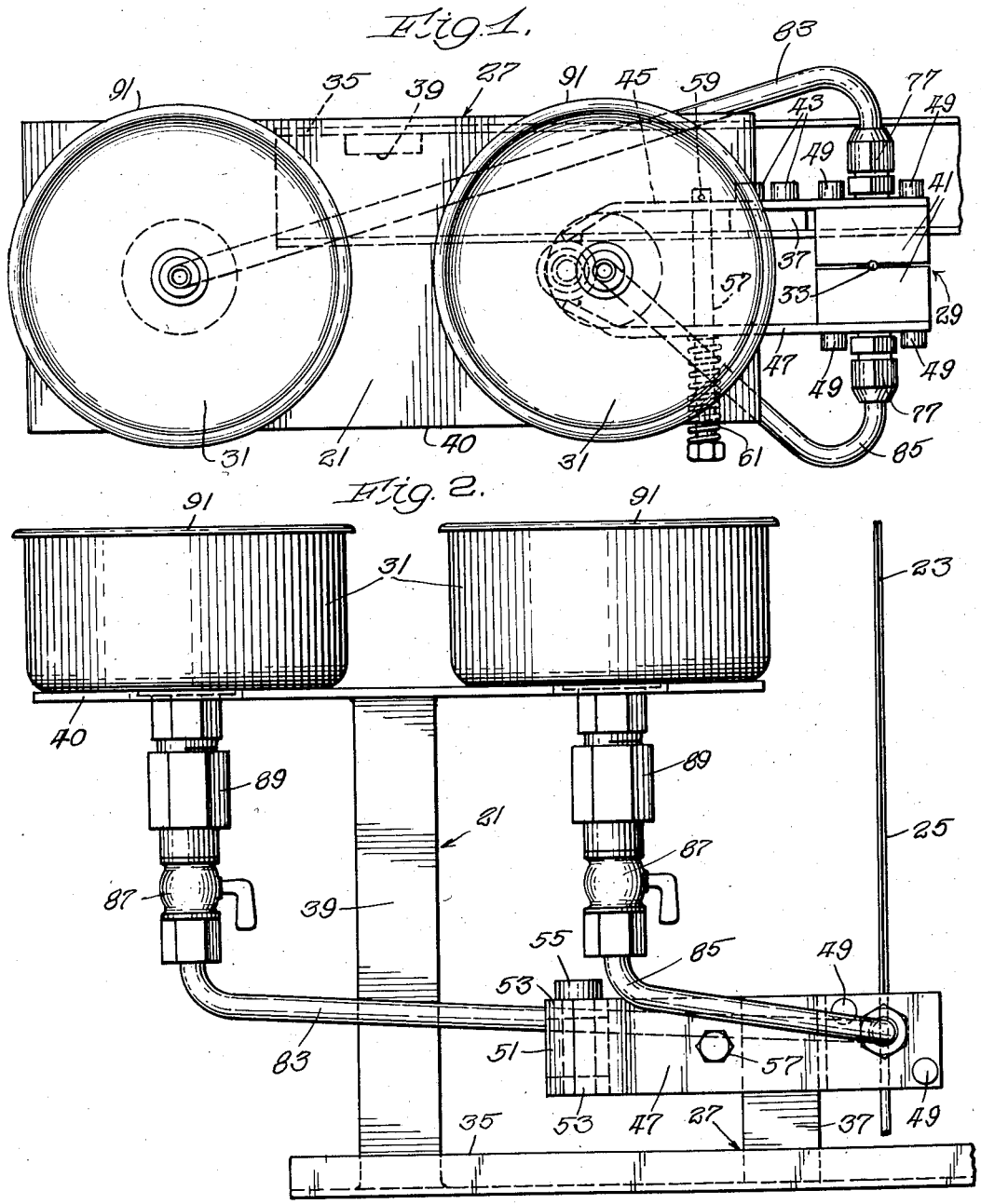
Inventor:
Einar R. Olson,
By Soans Glaister & Anderson
Attys.

April 7, 1959 E. R. OLSON 2,880,698
APPARATUS FOR APPLYING AXIALLY EXTENDING STRIPES TO
THE SURFACE OF AN INSULATED WIRE OR CORD
Filed March 8, 1956 4 Sheets-Sheet 2
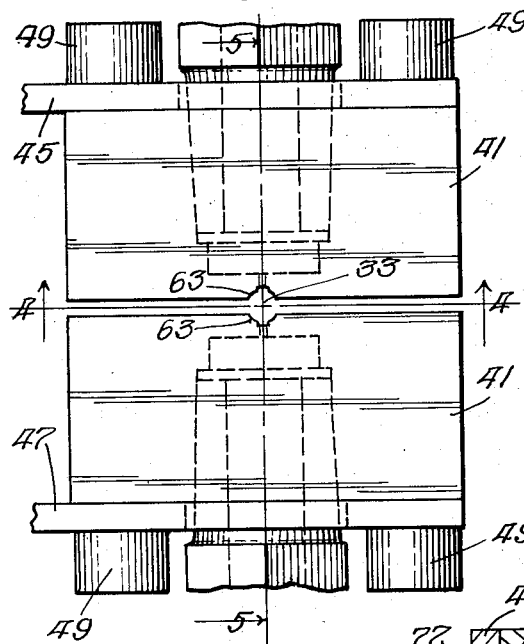
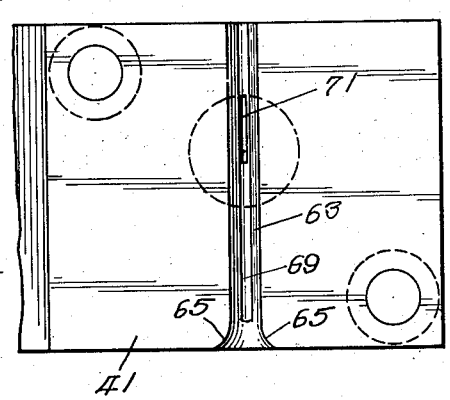
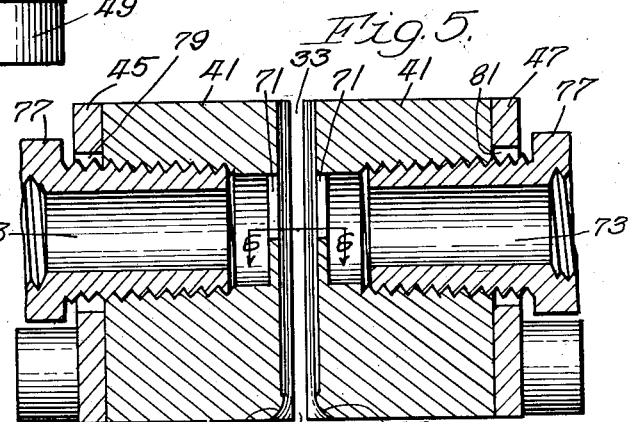
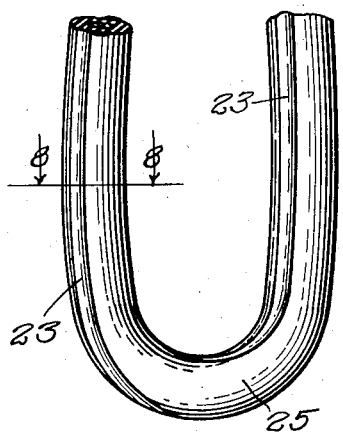
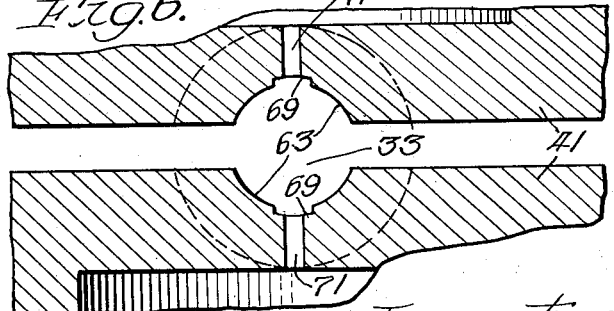
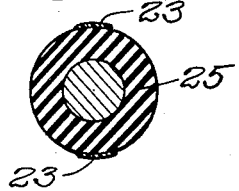
Inventor:
Einar R. Olson,
By Soans Glaister & Anderson
Attys.

April 7, 1959 E. R. OLSON 2,880,698
APPARATUS FOR APPLYING AXIALLY EXTENDING STRIPES TO
THE SURFACE OF AN INSULATED WIRE OR CORD
Filed March 8, 1956 4 Sheets-Sheet 3
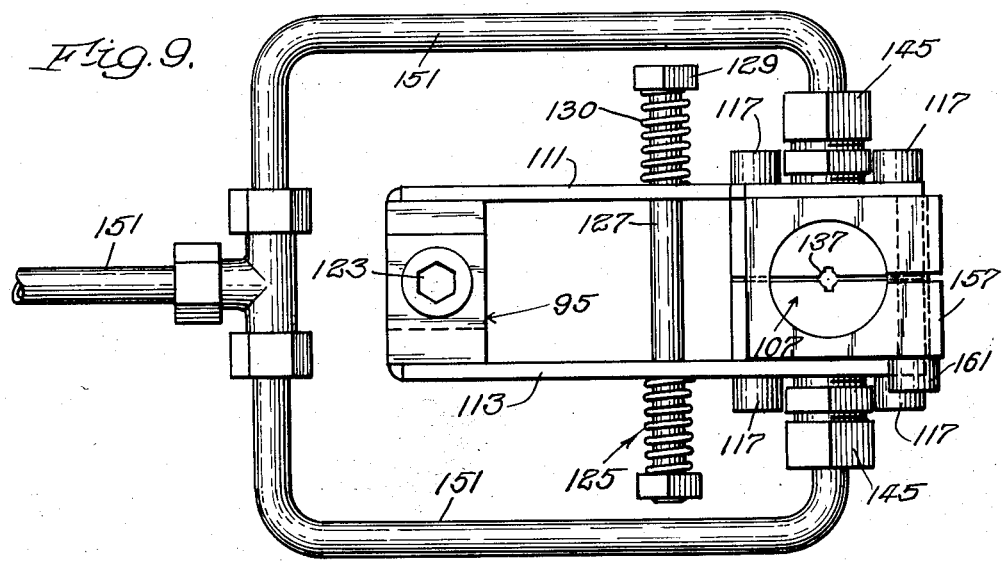
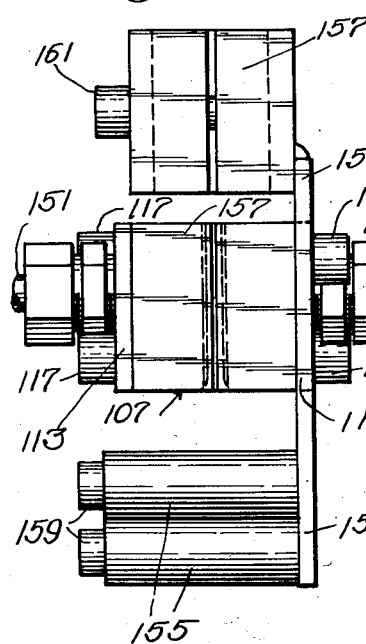
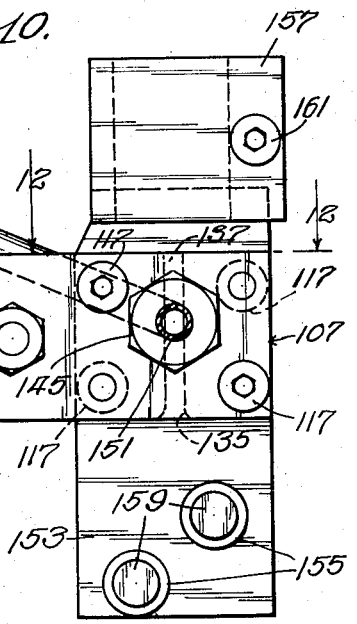
Inventor:
Einar R. Olson,
By Soans Glaister & Anderson
Attys.

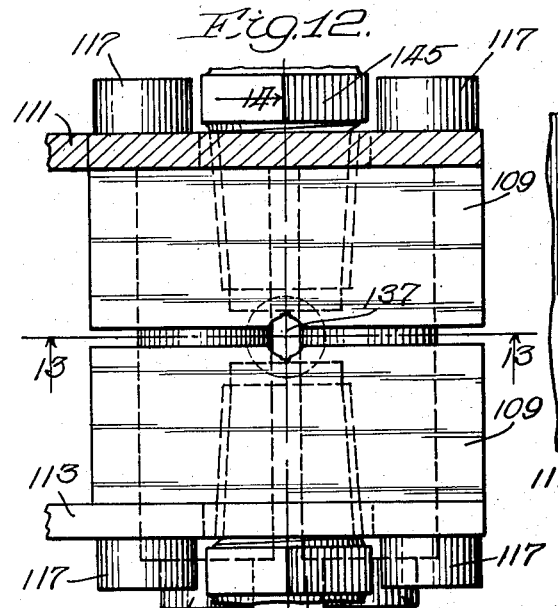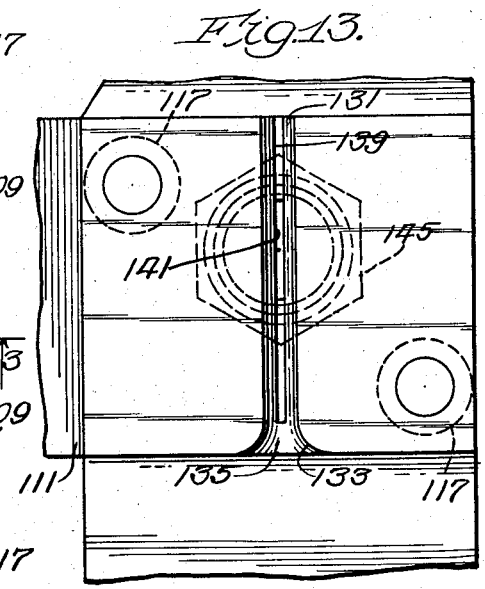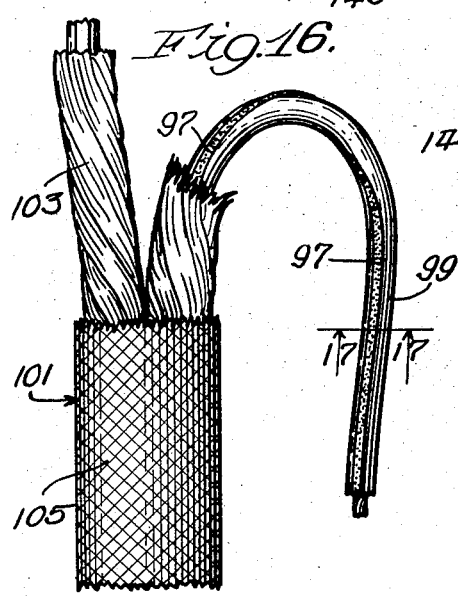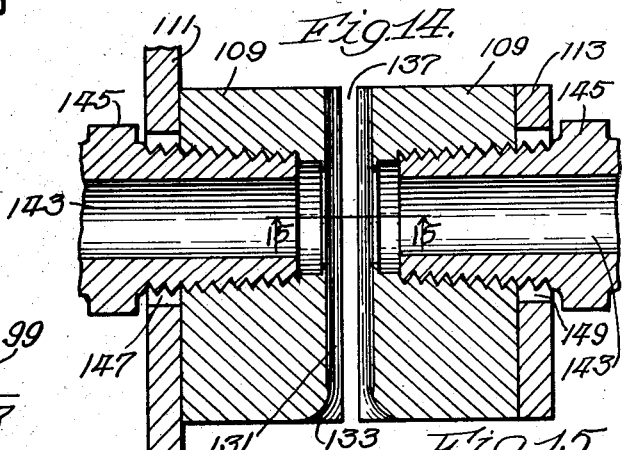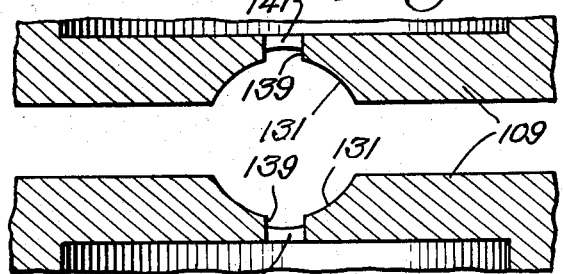

United States Patent Office 2,880,698
Patented Apr. 7, 1959

2,880,698

APPARATUS FOR APPLYING AXIALLY EXTENDING STRIPES TO THE SURFACE OF AN INSULATED WIRE OR CORD

Einar R. Olson, Richmond, Ind., assignor to Belden Manufacturing Company, Chicago, Ill., a corporation of Illinois Application March 8, 1956, Serial No. 570,295

5 Claims. (Cl. 118—405)

The present invention relates generally to applicators and more particularly to applicators which are capable of applying one or more axially extending stripes of lacquer, paint, adhesive, or other fluid materials to the surface of a continuously moving, insulated wire or cord.

Applicators formed in accordance with the present invention can be used in the manufacture of different types of electrical cords or cables, such as insulated hook-up or lead wires, heating cords, etc.

The identification of individual insulated lead wires is extremely important in various wiring circuits. This presents no problem when the lead wires include an outer braided fabric insulation since the braided insulation may incorporate any type of color pattern. In less expensive forms of insulated lead wire, such as rubber or plastic insulated lead wire, however, there has been no satisfactory method of lead wire identification. One form of the present applicator may be used in the manufacture of rubber or plastic insulated lead wire for applying axially extending lacquer or paint stripes to the surface of the insulated lead wire. Such stripes may be conveniently used for identifying individual lead wires.

Another form of applicator in accordance with the present invention may be used in the manufacture of a new type of braided, asbestos heating cord in which the inner metallic conductors are each covered with a vulcanized elastomer insulation and an outer wrap of asbestos roving. The applicator is used for applying axially extending stripes of a latex rubber adhesive to the vulcanized insulation surrounding the conductors prior to the application of the asbestos roving. The latex rubber adhesive holds the asbestos in position around the vulcanized insulation to the extent necessary for the subsequent steps in the manufacture of the heating cord.

The principal object of the present invention is to provide a means for applying axially extending stripes of a fluid material to the surface of a continuously moving insulated wire or cord. Further objects of the invention are to provide an applicator which is capable of applying well defined, axially extending stripes of lacquer or paint to the surface of a rubber, or plastic insulated lead wire without smearing, overlapping, etc.; to provide an applicator which is capable of applying axially extending lines or stripes of a latex rubber adhesive to the surface of a vulcanized elastomer insulated cord; and to provide such an applicator which is simple in construction, rugged and durable during use, and capable of operating over extended periods of time without requiring any form of adjustment or service.

Further objects and advantages of the invention will be better understood from the following specification wherein the invention is described by reference to the particular embodiments illustrated in the accompanying drawings.

In the drawings:

Figure 1 is a top plan view of an applicator formed in accordance with the present invention which is suitable for applying axially extending stripes of lacquer or paint to the surface of a continuously moving insulated wire;

Figure 2 is a side elevational view of the applicator shown in Figure 1;

Figure 3 is an enlarged top plan view of the paint applying portion or head of the applicator shown in Figure 1;

Figure 4 is a sectional view taken along the line 4—4 of Figure 3;

Figure 5 is a sectional view taken along the line 5—5 of Figure 3;

Figure 6 is an enlarged sectional view of the central portion of the applicator head taken along the line 6—6 of Figure 5;

Figure 7 is an enlarged perspective view of part of an insulated wire which includes axially extending lacquer or paint stripes such as are applied by the applicator shown in Figures 1 through 6;

Figure 8 is an enlarged sectional view taken along the line 8—8 of Figure 7;

Figure 9 is a plan view of a portion of the modified form of applicator formed in accordance with the present invention which is suitable for applying axially extending stripes of adhesive to the surface of a continuously moving insulated wire;

Figure 10 is a side elevational view of the central portion of the applicator shown in Figure 9;

Figure 11 is a front elevational view of the portion of the applicator which is shown in Figure 10;

Figure 12 is an enlarged sectional view of the adhesive applying portion or head of the applicator taken along the line 12—12 of Figure 10;

Figure 13 is a sectional view taken along the line 13—13 of Figure 12;

Figure 14 is a sectional view taken along the line 14—14 of Figure 12;

Figure 15 is an enlarged sectional view of the central portion of the applicator head taken along the line 15—15 of Figure 14;

Figure 16 is a perspective view of a heating cord which includes a pair of individual insulated cords which are provided with axially extending lines of adhesive stripes of an applicator such as are shown in Figures 9 through 15; and Figure 17 is an enlarged sectional view taken along the line 17—17 of Figure 16.

An applicator formed in accordance with the present invention includes a head having at least two facing members or sections which are adapted to pressingly engage the circumference of a moving insulated wire or cord. At least one of the head sections is provided with means for applying a narrow stripe or band of fluid material such as striping lacquer, paint, or adhesive to the surface of the insulated wire as the wire is drawn therethrough. This is accomplished by delivering the desired fluid material to a suitably designed, elongated channel located centrally within the area of surface engagement between the head section and the insulated conductor wire.

Referring to the drawings, Figures 1 through 6 illustrate an applicator 21 which is designed for applying a pair of axially extending lacquer or paint stripes 23 to the surface of an insulated lead wire 25 in the manner shown in Figures 7 and 8. The striping lacquer or paint stripes may be the same color or of different colors, as desired. Since an extremely large number of color combinations are possible, the paint stripes provide suitable identification means for any number of insulated lead wires.

The applicator 21 for applying lacquer or paint stripes includes a frame 27 which supports an applicator head 29 and paint storage tanks 31. The applicator head is provided with a central passageway 33 which accommodates the insulated lead wire 25 for sliding movement therethrough. Suitable means are provided for feeding lacquer or paint from the storage tanks 31 to the applicator head 29 and for applying such fluid material to the insulated wire 25 in a manner so as to provide the the insulated wire with axially extending stripes 23, as the insulated wire 25 is drawn through the passageway 33 in the applicator head 29.

The frame 27 includes a base 35 formed of steel channel or the like which may be bolted to the floor or to an auxiliary mechanism, steel bars or uprights 37 and 39 which are attached to the base 35 by welding or the like and a horizontally extending plate 40 which is welded or otherwise fixedly attached to the upper end of the upright 39.

The applicator head 29 includes two facing, elongated, generally rectangular members or sections 41 which are formed of any suitable material such as steel or the like. The applicator head sections 41 are attached to the outer ends of a pair of opposed, interconnected, horizontally extending steel hinge arms 45 and 47 by means such as cap screws 49. The inner ends of the hinge arms 45 and 47 connect with each toher through mating hinge sections 51 and 53 and a hinge pin 55. The upright 37 is attached to the hinge arm 45 by cap screws 43, thereby maintaining the hinge arms in vertically spaced relation to the base 35. A headed rod 57 extends laterally through the hinge arms 45 and 47 approximately half way between the hinge pin 55 and the applicator head 29. A holding pin 59 on the end of the rod exteriorly of the hinge arm 45 and a suitable coil steel spring 61 on the other end of the rod exteriorly of the opposite hinge arm coact so as to bias the hinge arms 45 and 47 towards each other.

The applicator head sections 41 which together form the applicator head 29 may be identical in construction and symmetrically positioned with respect to each other. Each of the sections 41 includes an elongated, arcuate, centrally located groove 63 which extends across the surface which faces the opposing section 41. Each of these grooves 63 has a circumferential extension of less than 180° and a radius slightly greater than that of the insulated lead wire 25 which is to be provided with axially extending paint stripes. The lower ends of the grooves 63 are desirably flared as indicated at 65 so as to provide a bell mouth 67 at the lower end of the passageway 33 for guiding the lead wire 25 thereinto.

In order to apply lacquer or paint axially of the insulated lead wire 25 as it passes through the applicator head 29, each of the elongated grooves 63 which extend through the head sections 41 includes a centrally positioned, shallow, generally U-shaped channel 69 which extends axially the entire length of each of the grooves 63. Each of the channels 69 is of a width equal to that of the stripes which are to be applied to the insulated lead wire 25. The depth of each of the channels 69 should be just sufficient to apply a surface layer or film of lacquer or paint to the surface of the lead wire and preferably should be between .003 and .006 inch. To provide lacquer or paint stripes of uniform thickness, the entire surface area of the base portion of each of the channels 69 should be uniformly spaced from the insulated wire 25 as it passes through the applicator head 29. This condition requires the base portion of each of the channels to be arcuate in transverse section and in general, concentric with the surface of the arcuate grooves 63. A generally rectangular passageway or slot 71 is provided for delivering laquer or paint centrally to each of the channels 69. The passageways 71 each have a width which generally should be slightly less than that of the connecting channel 69 and a suitable length which in general is preferably at least four times the width of the channel 69. The optimum length and width of the passageways 71 depend to a great extent upon the characteristics of the fluid material which is used in the applicator. Each of the passageways 71 connect with the central passageway 73 in an adapter 77 which passes through suitable openings 79 and 81 in the hinge arms 45 and 47 respectively and is threaded into the applicator head sections 41.

Lacquer or paint is stored in the storage tanks or pots 31 located on the steel supporting plate 40. The storage tanks 31 are located a suitable distance above the applicator head 29 so that the lacquer or paint may be fed by gravity to the applicator head. Each of the adapters 77 is connected to a separate storage tank 31 through suitable copper tubing 83 and 85, shut-off cocks 87, and adapters 89. The main sections of the copper tubing have a downward slant as shown in Figure 2 so as to permit the lacquer or paint to feed by gravity from the storage tanks 31 to the applicator head sections 41. Suitable covers 91 are provided for the storage tanks 31 to prevent the evaporation and drying of the lacquer or paint during use or storage.

In operation, suitable lacquers or paints such as commercially available printing paints are placed in the storage tanks 31. An insulated lead wire 25 having a radius preferably slightly less than that of the circumferential grooves 63 in the applicator head sections 41 to insure tight engagement against the outer edges of the channels 69 are guided through the bell mouth 67 formed by the lower ends of the grooves 63 and passed upwardly through the applicator head. The insulated lead wire 25 is attached to a suitable mechanism for continuously drawing the lead wire through the applicator head. The shut-off cocks 87 are then opened, permitting paint to pass from the storage tanks 31, through the copper tubing 83 and 85 into the rectangular passageways 71 and channels 69. Each of the channels 69 will continuously apply a thin film of the paint of a width equal to the width of the channel to the surface of the insulated lead wire as the wire passes through the passageway 33 of the applicator head. The spring 61 biases the hinge arms 45 and 47 and applicator head sections 41 towards each other so as to maintain the outer edges of the channels 69 in contacting engagement with the insulated conductor lead wire 25. Since the insulated lead wire 25 includes a generally resilient, pliable rubber or plastic exterior, the biasing force required is not so great as to impair the movement of the lead wire 25 through the applicator head 29.

A modified form of applicator 95 which is particularly suitable for use in applying axially extending stripes of adhesive 97 to the surface of a continuously moving insulated wire or cord 99 as illustrated in Figures 9 through 15. Insulated cords with axially extending glue stripes are particularly useful in the construction of a braided asbestos heater cord 101 such as illustrated in Figure 16. In forming the heater cord 101, asbestos roving 103 is wound around the adhesively coated insulated cord 99. The adhesive which is preferably of a latex rubber cement or the like provides a bond between the insulated cord 99 and the asbestos roving 103. During the process of wrapping the asbestos roving 103 around the insulated cord 99, the latex rubber cement is spread by the asbestos roving over a wider area than the relatively narrow stripes or bands 97 originally applied to the insulated cord. Two of the asbestos covered insulated cords are wound around each other and then tightly encased within the usual braided fabric jacket 105 to form the completed heating cord 101.

The applicator 95 may be generally similar to the paint applicator 21. However, in this case, only a single storage tank or pot (not shown) for adhesive need be used. The illustrated applicator 95 includes an applicator head 107 comprising a pair of facing, elongated, generally rectangular members or sections 109 formed of steel or the like which are attached to the outer ends of the inner faces of opposed hinge arms 111 and 113 by means of suitable cap screws 117. The inner ends of the hinge arms 111 and 113 are suitably interconnected by means of the hinge sections 119 and 121, respectively and a hinge pin or shoulder screw 123.

The two hinge arms 111 and 113 are biased towards each other by means of a suitable spring assembly 125 consisting of a bolt 127 which passes laterally through the hinge arms 111 and 113 between the hinge pin 123 and the applicator head 107, a fastening nut 129, and coil steel springs 130 which extend around the bolt 127 between the outer faces of the hinge arms and the ends of the bolt.

Each of the applicator head sections 109, which together form the applicator head 107, are identical in construction and are symmetrically positioned with respect to each other. Each of the sections 109 includes an elongated, arcuate, centrally located groove 131 which extends across the surface which faces the opposing section 109. Each of the grooves 131 has a circumferential extension of less than 180° and a radius slightly greater than that of the insulated cord 99 upon which adhesive stripes are to be applied. The lower ends of the grooves 131 are desirably flared as indicated at 133 so as to provide a bell mouth 135 for the applicator head 107 for guiding the insulated cord 99 through the passageway 137 formed by the opposed grooves 131 in the two sections 109 which form the applicator head.

Each of the elongated grooves 131 includes a centrally positioned, shallow, generally U-shaped channel 139 which extends axially the entire length of the groove. Each of the channels 139 is of a width equal to that of the adhesive stripes 97 which are to be applied to the insulated cord 99. The depth of the channels 139 should be sufficient to apply a surface layer or film of adhesive to the conductor cord 99 and preferably should be between .004 and .007 inch. The base portion of the U-shaped channel 139 may be arcuate in transverse cross section, however, since all that one generally desires is to smear the adhesive over the surface of a cord, the cross-sectional shape of the channel 139 is generally not critical.

A suitable rectangular passageway or slot 141 is provided for delivering adhesive centrally to each of the channels 139. Each of the passageways 141 may have a width approximately equal to the width of the associated channel 139 and of a length which in general must be at least four times the width of the channel 139. The exact width and length which is most suitable depends upon the characteristics of the adhesive which is to be used in the applicator. Each of the rectangular passageways 141 connects with a passageway 143 in an adapter 145 which extends through suitable openings 147 and 149 in the associated hinge arms 111 and 113, respectively and is threaded into the associated applicator head section 109.

Adhesive is stored in a suitable storage tank (not shown) located above the applicator head 107 so that the adhesive may be fed by gravity thereto. The storage tank is connected to the adapters 145 by means of suitable copper tubing 151. The copper tubing is arranged with a downward slant in the direction of the applicator head 107 so as to feed the adhesive by gravity to the applicator head. A suitable shut-off cock (not shown) which may be similar to the shut-off cocks 87 used in connection with the paint applicator 21 is provided for shutting off the feed of adhesive from the storage tank to the applicator head sections 109.

Auxiliary mechanisms may be provided for guiding the conductor cord 99 into and from the applicator head. As shown in Figures 10 and 11, one of the hinge arms may include lateral hinge arm extensions 153 which provide a support for guide rollers 155 and an elongated split ring connector 157. The guide rollers 155 are connected by means of shoulder screws 159 to the lateral extension 153 which extends below the applicator head 107. The rollers 155 are suitably positioned to turn a generally horizontally moving insulated cord 99 into position for upward movement into and through the applicator head. The split ring connector 157 which is adapted for connection to the entrance of an asbestos serving machine is suitably welded to the lateral hinge arm extension 153 which extends above the applicator head 107. If desired, the applicator may be hung from the asbestos serving machine by the split ring connector rather than supported by a base or stand (not shown). A suitable shoulder screw 161 is provided for tightening the split ring onto a complementary portion of the asbestos serving machine. The split ring connector 157 is suitably positioned so that the bore therethrough lies centrally above the passageway 137 formed by the applicator head sections 109.

In operation, an insulated cord 99 is fed through the rollers 155 and thence upwardly through the applicator head 107 and into an asbestos serving machine. The shut-off cock in the adhesive feed line is opened, thus permitting the adhesive to pass from the storage tank through the copper tubing 151 to the applicator head sections 109. Each of the channels 139 will continuously apply a thin film of the adhesive of a width equal to the width of the channels to the insulated cord as it passes through the passageway 137. When latex rubber cement is the adhesive used, it is generally thinned with benzine so that it will flow readily through the supply tubing and applicator head sections. The proper mixture may be easily determined by trial and inspection. The benzine evaporates relatively soon after the adhesive is applied to the insulated cord 99 and does not cause any subsequent difficulty. If desired, the adhesive may be sufficiently thin so that it spreads out slightly over the surface of the insulated cord between the time that it leaves the applicator head 107 and before the asbestos serving is applied. The springs 130 bias the applicator head sections 109 towards each other and maintain the outer edges of the channels 139 in contacting engagement with the surface of the insulated cord 99 without impairing the movement of the conductor cord through the applicator head 107.

The described applicators are simple and inexpensive in construction, yet provide effective and durable means for applying axially extending stripes of a fluid material such as paint and adhesive to the surface of continuously moving conductor cords.

It is obvious that various changes in the design and construction of the applicators are possible without deviating from the scope of the present invention. For example, the described applicator heads might be formed from a greater number of mating pieces and with any number of desired channels for applying lateral stripes to an insulated wire or cord. In addition, the fluid material used could be fed by other means such as by forced feeding to the channels in the applicator head rather than by the gravity means disclosed.

I claim:

1. Apparatus for applying an axially extending stripe to the surface of a continuously moving insulated wire comprising an elongated applicator head, a generally cylindrical passageway extending through said applicator head for slidably accommodating an insulated wire for movement therethrough, a shallow, generally U-shaped, axially extending channel in said passageway, said channel extending the full length of said passageway, means for maintaining an insulated wire in engagement with the outer edges of said channel as said wire is drawn through said passageway, and means for delivering fluid material to said channel approximately centrally thereof during the movement of said insulated wire through said passageway.

2. Apparatus for applying a pair of axially extending stripes to the surface of a continuously moving insulated wire comprising an elongated head formed of a pair of opposing, generally rectangular, symmetrical sections, said opposing sections having facing surfaces which include opposing, longitudinally extending grooves which together form a generally cylindrical passageway for slidably accommodating an insulated wire for movement therethrough, a generally centrally positioned, U-shaped, axially extending channel in each of said grooves, said channels extending the full length of said grooves, means biasing said opposing sections towards each other for maintaining an insulated cord in engagement with the outer edges of said channel as said wire is drawn through said cylindrical passageway, and means for delivering fluid material to said channels approximately centrally thereof during the movement of said insulated wire through said cylindrical passageway.

3. Apparatus for applying a pair of axially extending stripes to the surface of a continuously moving insulated wire comprising an applicator head which includes a pair of opposing, generally elongated, symmetrical sections, said opposing sections having a pair of generally flat facing surfaces, said facing surfaces having opposing, longitudinally extending, arcuate grooves therein which together form a generally cylindrical passageway for slidably accommodating an insulated wire for movement therethrough, each of said grooves having a circumferential extension of less than 180° and having a radius slightly greater than that of a selected insulated wire, each of said longitudinally extending grooves having a generally centrally positioned, shallow, generally U-shaped channel extending the axial length thereof, said opposing sections being supported adjacent the outer ends of a pair of connecting hinge arms, means biasing the outer ends of said hinge arms towards each other for maintaining the outer edges of said rectangular recesses in engagement with said selected insulated wire as said wire is drawn between said sections along said arcuate grooves, one end of said opposing arcuate grooves being bevelled so as to form a bell-shaped entrance into said cylindrical passageway and means for delivering fluid material through said U-shaped channels approximately centrally thereof during the movement of said insulated wire through said passageway.

4. Apparatus for applying a pair of axially extending stripes to the surface of a continuously moving insulated wire comprising an applicator head which includes a pair of opposing, generally elongated, symmetrical sections, said opposing sections having a pair of generally flat facing surfaces, said facing surfaces having opposing, longitudinally extending, arcuate grooves therein which together form a generally cylindrical passageway for slidably accommodating an insulated wire for movement therethrough, each of said grooves having a circumferential extension of less than 180° and having a radius slightly greater than that of a selected insulated wire, each of said longitudinally extending grooves having a generally centrally positioned, shallow, generally U-shaped channel extending the axial length thereof, a separate rectangular passageway for delivering fluid material centrally to each of said channels, each of said rectangular passageways having a width no greater than that of its associated channel, said opposing sections being supported adjacent the outer ends of a pair of hinge arms, means biasing the outer ends of said hinge arms towards each other for maintaining the outer edges of said U-shaped channels in engagement with said selected insulated wire as said wire is drawn between said sections along said arcuate grooves, one end of said arcuate grooves being beveled so as to form a bell-shaped entrance into said cylindrical passageway, storage supply means for fluid material and conduit means connecting said fluid storage supply means with the rectangular passageways in said opposing head sections.

5. Apparatus for applying a pair of axially extending stripes to the surface of a continuously moving insulated wire comprising an applicator head which includes a pair of opposing, generally elongated, symmetrical sections, said opposing sections having a pair of generally flat facing surfaces, said facing surfaces having opposing, longitudinally extending, arcuate grooves therein which together form a generally cylindrical passageway for slidably accommodating an insulated wire for movement therethrough, each of said grooves having a circumferential extension of less than 180° and having a radius slightly greater than that of a selected insulated wire, each of said longitudinally extending grooves having a generally centrally positioned, shallow, generally U-shaped channel extending the axial length thereof, a separate rectangular passageway for delivering fluid material centrally to each of said channels, each of said rectangular passageways having a width no greater than that of its associated channel, and each of said channels having a depth between .003 and .007 inch, said opposing sections being supported adjacent the outer ends of a pair of connecting hinge arms, means biasing the outer ends of said hinge arms towards each other for maintaining the outer edges of said U-shaped channels in engagement with said selected insulated wire as said wire is drawn between said sections along said arcuate grooves, one end of said opposing arcuate grooves being bevelled so as to form a bell-shaped entrance into said cylindrical passageway, a storage tank for fluid material for each of said opposing head sections, and conduits connecting said storage tanks with the rectangular passageways in said opposing head sections, said conduits slanting in a generally downward direction so as to feed said fluid material by gravity from said storage tanks to said opposing sections.

References Cited in the file of this patent

UNITED STATES PATENTS

| | | |
|---|---|---|
| 1,501,764 | Flint | July 15, 1924 |
| 2,016,316 | Collins | Oct. 8, 1935 |
| 2,133,446 | Gwaltney | Oct. 18, 1938 |
| 2,287,589 | Wilson et al. | June 23, 1942 |
| 2,325,950 | Greene et al. | Aug. 3, 1943 |
| 2,375,493 | Randall | May 8, 1945 |
| 2,433,673 | Mulvey | Dec. 30, 1947 |
| 2,562,500 | Lunt et al. | July 31, 1951 |
| 2,610,607 | Isenberg | Sept. 16, 1952 |
| 2,749,880 | Richardson et al. | June 12, 1956 |

FOREIGN PATENTS

| | | |
|---|---|---|
| 423,496 | Great Britain | Feb. 1, 1935 |